United States Patent [19]
Kendrick

[11] 3,795,194
[45] Mar. 5, 1974

[54] MODEL ROCKET

[76] Inventor: William T. Kendrick, 2546 Chain Bridge Rd., Apt. 5-3, Vienna, Va. 22180

[22] Filed: Jan. 3, 1972

[21] Appl. No.: 214,698

[52] U.S. Cl............... 102/34.1, 46/74 A, 102/34.2, 102/34.4
[51] Int. Cl.............................................. C06d 1/04
[58] Field of Search .......... 102/34–34.7, 49.3–49.7; 60/35.6 RS, 36.5 RJ; 46/74 A

[56] References Cited
UNITED STATES PATENTS

| | | | |
|---|---|---|---|
| 3,068,792 | 12/1962 | Brown et al. | 102/34.1 |
| 3,173,249 | 3/1965 | Wiggins | 60/35.6 |
| 2,087,281 | 7/1937 | Fabrizio | 102/34.2 |
| 2,841,084 | 7/1958 | Carlisle | 102/34.1 |

FOREIGN PATENTS OR APPLICATIONS

| | | | |
|---|---|---|---|
| 589,726 | 2/1925 | France | 60/35.6 RR |
| 1,546,763 | 10/1968 | France | 102/34.1 |

*Primary Examiner*—Robert F. Stahl
*Attorney, Agent, or Firm*—Mason, Mason & Albright

[57] ABSTRACT

A model air rocket assembly includes a finless cylindrical body of substantially uniform diameter. The assembly comprises a nose cone, an intermediate canister tube and a lower body tube. The engine is positioned in an engine tube held concentrically within the canister tube. The engine tube extends down to approximately the lower edge of the canister tube and openings are arranged around the lower portion of the canister tube to admit air which augments the engine thrust through the body tube and provides aerodynamic stability.

4 Claims, 3 Drawing Figures

MODEL ROCKET

It is an object of the present invention to provide a model rocket which has its engine located substantially above its lower edge about midway of the rocket's length with openings arranged adjacent the engine to augment the engine thrust and provide aerodynamic stability.

These and other objects will be apparent from the below description and appended drawings in which.

Figures 1, 2, 3:
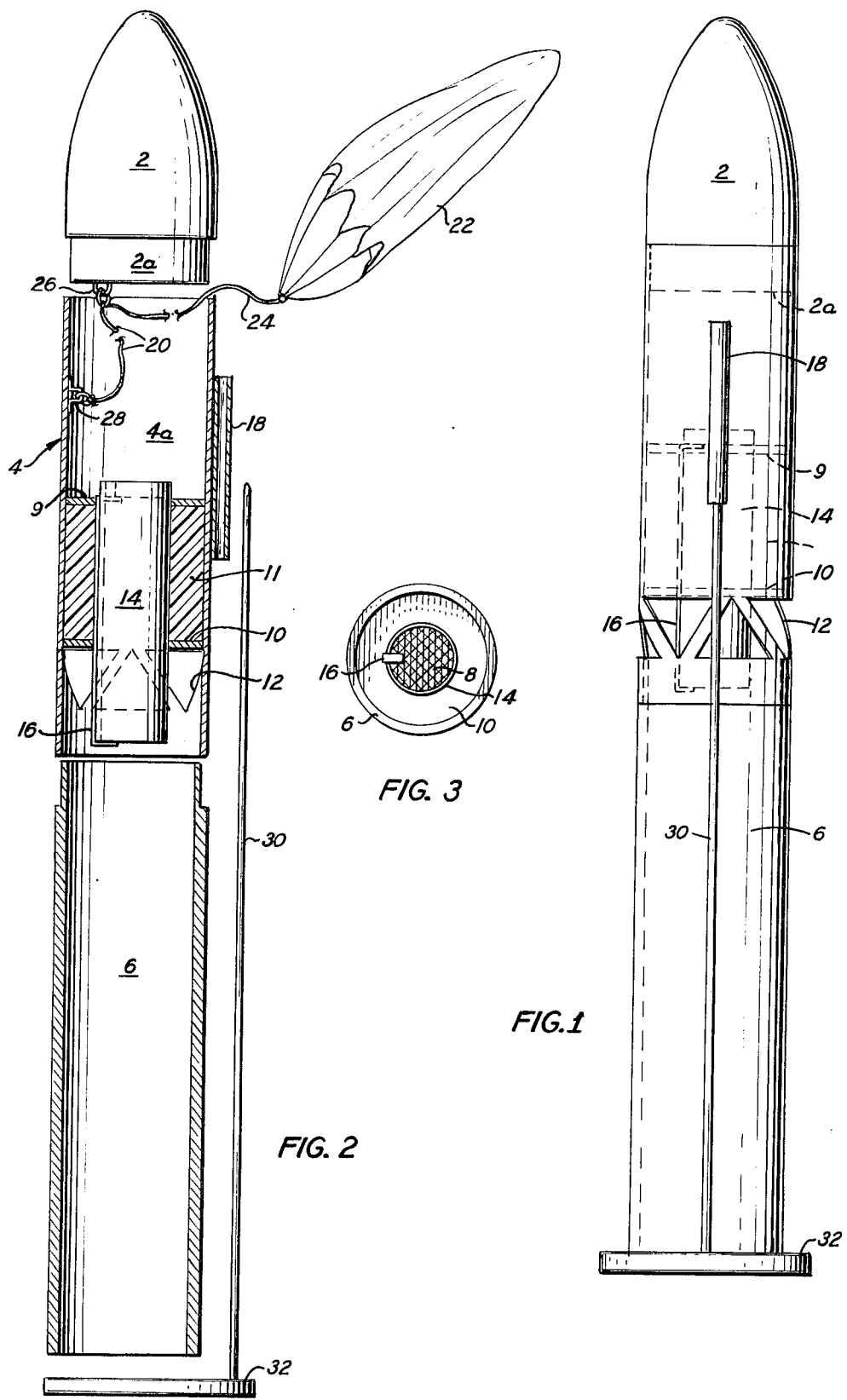
FIG. 1 is a side view of the rocket assembly secured to a launch stand.
FIG. 2 is an exploded view of the FIG. 1 rocket assembly with parts in section.
FIG. 3 is a bottom view of the canister tube showing the engine held in the concentric engine tube.

In FIGS. 1 and 2, the rocket assembly includes nose cone 2 necked down at 2a to slideably fit within the top end of canister tube 4 which, in turn, receives the necked down upper end 6a, of body tube 6. Body tube 6 has no parts and serves as a base for the assembly and can rest on the best of stand 30 as seen in FIG. 1.

Canister tube 4 houses a replaceable engine 8 shown in FIG. 2, and the engine 8 is normally placed so that its upper surface is spaced and bulkheaded with a cardboard ring 9 located at about the centerline of the length of the canister tube 4. The engine 8 is also bulkheaded and centered and at its lower end with a second ring 10 at approximately the line where openings 12 begin. Between the rings, a solid filler 11 can be used reinforce rings 9 and 10 and also, to correctly position the engine 8. The openings 12 are regularly spaced about the skirt of canister tube 4 to terminate above the bottom edge of the canister tube. A launch lug 18 is preferably secured to the side of canister tube 4, approximately midway its longitudinal length.

The engine 8 is centered and held within an engine tube 14, which extends concentric with canister tube 4. An engine lock 16 is glued or otherwise affixed to the outside of engine tube 14 so that its bent over ends extend within tube 14 to releasably secure the replaceable engine 8.

Chamber 4a in the upper portion of canister tube 4, receives shock cord 20 and a parachute 22 or other streamer on cord 24. Cords 20 and 24 are tied to anchor ring 26 on nose cone 2 and shock card 20 is also secured to a second anchor ring 28 within chamber 4a.

It will be noted that engine tube 14 is lipped to extend slightly above bulkhead ring 9, but its lower end depends downwardly to a location slightly below openings 12. The openings 12 are shown in the form of open triangles which are alternatively inverted to admit relatively large quantities of air but other shapes and opening sizes are suitable.

In operation, the engine 8 has wire connections (not shown) which are secured in the conventional way, i.e., paper clips, etc. to a battery circuit with a remote switch. The launching lug 18 is secured to an upright member 30 attached to stand 32 and the rocket assembly rests on the stand 32. Upon firing, the engine 8 ignites the power the flight of the assembly upwardly. The jet of hot gases is directed downwardly from the lower end of engine tube 14 and the stream of gases from engine 8 sucks air in through the openings 12 to significantly augment the thrust of the engine 8 and provides aerodynamic stability without other control surfaces. After burnout and coasting, the nose cone rejects to allow the streamer or parachute 22 escape in the usual way and thus provide for slow descent and a soft landing.

It will be noted that the rocket, including the nose cone, the canister tube and the body tube are of the same diameter and there are no fins on the body tube. Further, the engine is located substantially above the lower edge of the rocket assembly which, heretofore, has been deemed inoperative because of the "Krushnic Effect." The "Krushnic Effect" is supposed to result in no thrust when the engine is recessed more than 50 percent of the diameter of the tube body. However, with the structure shown in the drawings, more than the usual engine thrust results because of the air flow through openings 12.

In one model rocket with a diameter of 1.5 inches and an overall length of about 14 inches, according to the instant invention, the body tube was made about 6 inches long, the canister tube was about 5 inches in length and the nose cone almost 3 inches in length. The engine was located within the canister tube almost 8 inches from the lower edge of the body tube with a plurality of triangular openings located about 6.5 inches – 7.5 inches from the lower edge.

Contrary to expectations, the rocket launched correctly and had a larger thrust with high flight path in a stable manner than would have been the case if the engine was placed at the bottom of the assembly as is usually done according to recommendations.

What is claimed is:

1. A cylindrical, finless toy rocket assembly, to be propelled in the air, having a substantially uniform exterior cross section throughout its length, comprising an intermediate cylindrical canister tube having a top end and a bottom end, an ogival nose cone detachably fitted in and closing the top end of said canister tube, a lower cylindrical body tube connected to said bottom end of said canister tube, a shock cord and streamer means received in the canister tube adjacent the top end of said canister tube, a replaceable engine and a concentric engine mounting tube fitted in the canister tube spacing the engine axially from the canister tube interior, said mounting tube being longitudinally spaced from the bottom end of said canister tube and said engine extending to substantially the bottom end of said canister tube, the canister tube defining a plurality of openings adjacent the bottom end and surrounding said engine whereby the thrust of said engine is directed into said body tube and air is admitted through said canister tube openings to augment the thrust of the engine and provide aerodynamic stability.

2. The assembly of claim 1, wherein the lower portion of said engine tube terminates below said openings.

3. The assembly of claim 1, wherein said engine tube is located at least as high as the connection between said body tube and said canister tube.

4. The assembly of claim 1, wherein a launch lug is secured to said canister tube.

* * * * *